(12) United States Patent
Ivey et al.

(10) Patent No.: US 8,830,080 B2
(45) Date of Patent: *Sep. 9, 2014

(54) INTEGRATION OF LED LIGHTING CONTROL WITH EMERGENCY NOTIFICATION SYSTEMS

(71) Applicant: iLumisys, Inc., Troy, MI (US)

(72) Inventors: John Ivey, Farmington Hills, MI (US); David L. Simon, Grosse Point Woods, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,387

(22) Filed: Mar. 21, 2013

(65) Prior Publication Data

US 2013/0285827 A1    Oct. 31, 2013

Related U.S. Application Data

(63) Continuation of application No. 12/257,773, filed on Oct. 24, 2008.

(51) Int. Cl.
| | | |
|---|---|---|
| G08B 23/00 | (2006.01) | |
| G08B 21/00 | (2006.01) | |
| G08B 5/36 | (2006.01) | |
| F21V 33/00 | (2006.01) | |
| H05B 33/08 | (2006.01) | |
| G08B 7/06 | (2006.01) | |
| F21Y 101/02 | (2006.01) | |
| F21K 99/00 | (2010.01) | |

(52) U.S. Cl.
CPC .............. *G08B 5/36* (2013.01); *F21V 33/0076* (2013.01); *F21Y 2101/02* (2013.01); *H05B 33/0854* (2013.01); *F21K 9/17* (2013.01); *Y02B 20/383* (2013.01); *G08B 7/06* (2013.01)
USPC ................. 340/815.4; 340/693.5; 340/693.9; 340/693.11; 340/628; 340/632

(58) Field of Classification Search
None
See application file for complete search history.

(56) References Cited

U.S. PATENT DOCUMENTS

| | | | | |
|---|---|---|---|---|
| 3,969,720 | A * | 7/1976 | Nishino | 340/815.69 |
| 4,531,114 | A * | 7/1985 | Topol et al. | 340/539.1 |
| 4,801,928 | A * | 1/1989 | Minter | 340/691.2 |
| 4,904,988 | A * | 2/1990 | Nesbit et al. | 340/628 |
| 5,713,655 | A * | 2/1998 | Blackman | 362/95 |
| 5,831,522 | A * | 11/1998 | Weed et al. | 340/473 |
| 5,848,837 | A * | 12/1998 | Gustafson | 362/235 |
| 5,966,069 | A * | 10/1999 | Zmurk et al. | 340/636.16 |
| 6,000,807 | A * | 12/1999 | Moreland | 362/95 |
| 6,010,228 | A * | 1/2000 | Blackman et al. | 362/95 |
| 6,249,221 | B1 * | 6/2001 | Reed | 340/539.14 |
| 7,218,056 | B1 * | 5/2007 | Harwood | 315/86 |
| 7,423,548 | B2 * | 9/2008 | Kontovich | 340/691.1 |
| 7,800,511 | B1 * | 9/2010 | Hutchison et al. | 340/691.1 |
| 7,848,702 | B2 * | 12/2010 | Ho et al. | 455/11.1 |
| 8,183,989 | B2 * | 5/2012 | Tsai | 340/330 |
| 2007/0211461 | A1 * | 9/2007 | Harwood | 362/232 |
| 2007/0236358 | A1 * | 10/2007 | Street et al. | 340/628 |
| 2012/0098439 | A1 * | 4/2012 | Recker et al. | 315/152 |

\* cited by examiner

*Primary Examiner* — Julie Lieu
(74) *Attorney, Agent, or Firm* — Young Basile

(57) ABSTRACT

An emergency lighting system for a building includes at least one LED-based light. An emergency detector is operable to detect an emergency. The emergency detector produces an emergency signal in response to the emergency. A controller is operable to control the at least one LED-based light in response to the emergency signal.

6 Claims, 2 Drawing Sheets

INTEGRATION OF LED LIGHTING CONTROL WITH EMERGENCY NOTIFICATION SYSTEMS

CROSS-REFERENCE TO RELATED APPLICATIONS

This application is a continuation of U.S. application Ser. No. 12/257,773, filed Oct. 24, 2008, which is hereby incorporated by reference in its entirety.

TECHNICAL FIELD

The present invention relates to emergency notification systems, and more particularly to integrating an emergency notification system with an LED-based light.

BACKGROUND

Many buildings include several types of alarm systems, such as smoke detectors, fire alarms, burglar alarms, and alarms to indicate that a door is ajar. A building may additionally include other alarms depending on the types of danger that the building is susceptible to, e.g., a tornado alarm or an air raid siren. These alarms are generally stand-alone units (i.e., separate from and not in communication with other systems). The alarms may be powered by their own power supplies, such as replaceable batteries. A light may be included with an alarm. For example, some fire alarms include strobe lights that flash to indicate detected fires.

Additionally, buildings have lighting systems. For example, many commercial buildings include fluorescent lighting fixtures for use with fluorescent tubes, though other types of lighting systems using other types of lights, e.g., incandescent lights, are also occasionally used. Fixtures are typically hard-wired to a power source, such as an electric utility line. Additionally, a back-up power source such as a generator may be employed for use when the electric utility line is not functioning. Operation of the lighting system is generally independent of operation of the alarms. That is, the lighting system may produce a generally constant flux of light so long as a switch controlling the lighting system is in an "on" position regardless of whether one or more of the alarms becomes activated.

BRIEF SUMMARY

The present invention provides an emergency lighting system for a building. The lighting system includes at least one LED-based light. An emergency detector is operable to detect an emergency and to produce an emergency signal in response to the emergency. A controller is operable to control the at least one LED-based light in response to the emergency signal.

In another example, an LED-based light for use in an emergency lighting system including an emergency detector operable to output an emergency signal is provided. The LED-based light includes at least one LED and a controller configured to operate the at least one LED in a normal mode and an emergency mode in response to the emergency signal.

In yet another example, an LED-based light for replacing a fluorescent tube in a fixture is provided. The light features a housing including a light transmitting portion. A circuit board extends longitudinally within the housing. Multiple LEDs are mounted on the circuit board and oriented to produce light through the light transmitting portion of the housing. An emergency detector is operable to output an emergency signal in response to an emergency. A controller is operable to control the at least one LED in a normal mode and an emergency mode in response to the emergency signal. A pair of standard sized electrical connectors is included, with one at each longitudinal end of the housing. The LEDs, emergency detector, and controller are each electrically coupled to at least one of the electrical connectors.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
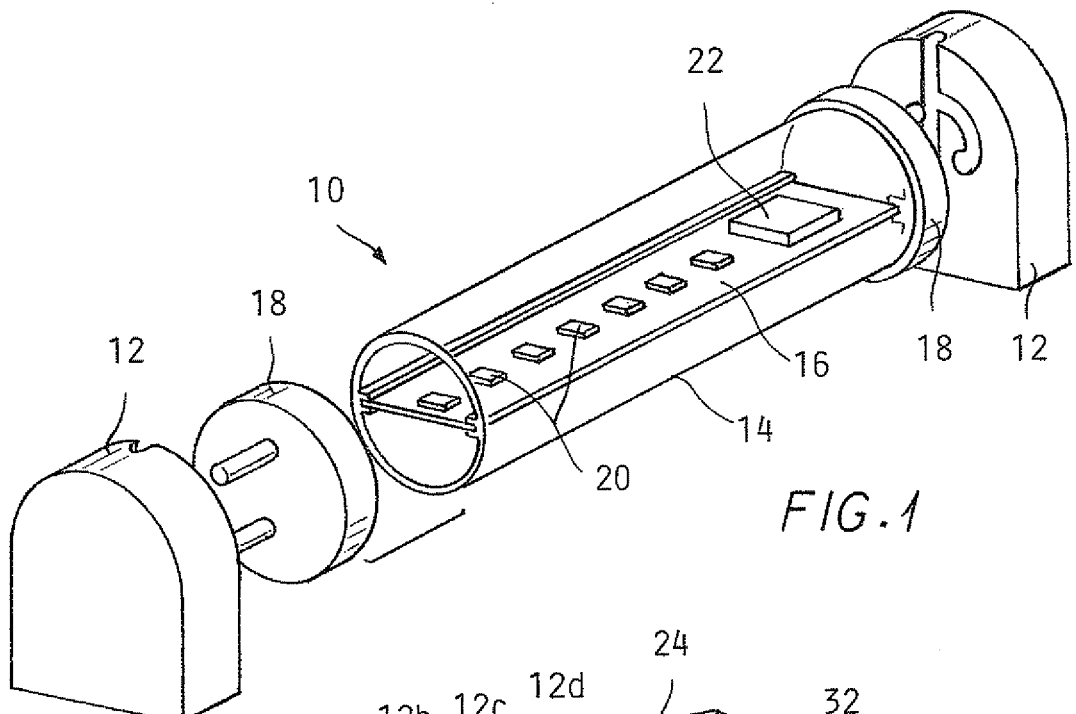
FIG. 1 is a schematic perspective view of an example of an LED-based light for use in an emergency lighting system.

Embodiments of an emergency lighting system and an LED-based light for use in an emergency lighting system according the invention are discussed with reference to FIGS. 1-6. FIG. 1 illustrates an LED-based light 10 for use in a standard fixture 12, such as a fixture designed to accept T5, T8, T10, or T12 tubes. As such, the LED-based light 10 can have the shape of a standard tube, i.e., the shape of a T5, T8, T10, or T12 tube, or otherwise be shaped for compatibility with the standard fixture 12. Alternatively, another example of an LED-based light can have an alternative shape from the illustrated light 10 for use in fixtures that accept other types of standard sized lights, such as incandescent bulbs or standard sized halogen lamps. However, all examples of LED-based lights need not be compatible with the fixture 12 or another type of standard fixture. That is, yet another example of an LED-based light can be powered by a battery or connected to a power source by means such as hard-wiring the light to a power source.

As shown in FIG. 1, the light 10 includes a housing 14, a circuit board 16, a pair of end caps 18, multiple LEDs 20, and a controller 22 in a single package defined by the housing 14 and end caps 18. The housing 14 as shown in FIG. 1 is a light transmitting cylindrical tube. The housing 14 can be made from polycarbonate, acrylic, glass or another light transmitting material (i.e., the housing 14 can be transparent or translucent). For example, a translucent housing 14 can be made from a composite, such as polycarbonate with particles of a light refracting material interspersed in the polycarbonate. While the illustrated housing 14 is cylindrical, a housing having a square, triangular, polygonal, or other cross sectional shape can alternatively be used. Similarly, while the illustrated housing 14 is linear, a housing having an alternative shape, e.g., a U-shape or a circular shape can alternatively be used. Additionally, the housing 14 need not be a single piece as shown in FIG. 1. Instead, another example of a housing can be formed by attaching multiple individual parts, not all of which need to be light transmitting. For example, such a housing can include an opaque lower portion and a lens or other transparent cover attached to the lower portion to cover the LEDs 20. The housing 14 can be manufactured to include light diffusing or refracting properties, such as by surface roughening or applying a diffusing film to the housing 14. For compatibility with the fixture 12 as discussed above, the housing 14 can have a length such that the light 10 is approximately 48" long, and the housing 14 can have a 0.625", 1.0", or 1.5" diameter.

The circuit board 16 as illustrated in FIG. 1 is an elongate printed circuit board. Multiple circuit board sections can be joined by bridge connectors to create the circuit board 16. The circuit board 16 as shown in FIG. 1 is slidably engaged with the housing 14, though the circuit board 16 can alternatively be clipped, adhered, snap- or friction-fit, screwed or otherwise connected to the housing 14. For example, the circuit board 16 can be mounted on a heat sink that is attached to the housing 14. Also, other types of circuit boards may be used, such as a metal core circuit board. Or, instead of a circuit board 16, other types of electrical connections (e.g., wires) can be used to electrically connect the LEDs 20 to a power source.

The light 10 can include two bi-pin end caps 18 (i.e., each end cap 18 can carry two pins), one at each longitudinal end of the housing 14, for physically and electrically connecting the light 10 to the fixture 12. The end caps 18 can be the sole physical connection between the light 10 and the fixture 12. The end caps 18 can be electrically connected to the circuit board 16 to provide power to the LEDs 20. Each end cap 18 can include two pins, though two of the total four pins can be "dummy pins" that do not provide an electrical connection. Alternatively, other types of electrical connectors can be used, such as an end cap carrying a single pin. Also, while the end caps 18 are shown as including cup-shaped bodies, apparatuses having a different configuration can alternatively be used (e.g., plugs lodged in ends of the housing 14 can carry pins or other electrical connectors). One or both of the end caps 18 can additionally include electric components, such as a rectifier and filter.

The LEDs 20 can be surface-mount devices of a type available from Nichia, though other types of LEDs can alternatively be used. For example, although surface-mounted LEDs 20 are shown, one or more organic LEDs can be used in place of or in addition thereto. The LEDs 20 can be mounted to the circuit board 16 by solder, a snap-fit connection, or other means. The LEDs 20 can produce white light. However, LEDs that produce blue light, ultra-violet light or other wavelengths of light can be used in place of white light emitting LEDs 20.

The number of LEDs 20 can be a function of the desired power of the light 10 and the power of the LEDs 20. For a 48" light, such as the light 10, the number of LEDs 20 can vary from about five to four hundred such that the light 10 outputs approximately 500 to 3,000 lumens. However, a different number of LEDs 20 can alternatively be used, and the light 10 can output a different amount of lumens. The LEDs 20 can be evenly spaced along the circuit board 16, and the spacing of the LEDs 20 can be determined based on, for example, the light distribution of each LED 20 and the number of LEDs 20.

The controller 22 can be digital and include a CPU and a memory, such as RAM or another type of memory, though a controller including analog circuits can be used. The controller 22 can be mounted on the circuit board 16 to communicate with other components and to receive power from one or both of the end caps 18. Alternatively, the controller 22 can be coupled to a different power source such as a battery. The controller 22 can be configured to control an amount of power provided to each LED 20 using pulse width modulation. A program for controlling the LEDs 20 can be stored on the memory for execution by the CPU. The controller 22 can further include a signal receiver. The signal receiver can be hard-wired (e.g., using a telephone line, current-carrying wire, or Ethernet cable) to a signal source to receive a signal, or the signal receiver can be configured to wirelessly receive the signal using a standardized protocol such as IEEE 802.11, a protocol for radio communication, Bluetooth, a cellular standard (e.g., 3G or another cellular standard), or another wireless protocol. The signal receiver can be in communication with the CPU. The functionality of the controller is discussed below in greater detail in reference to FIGS. 2 and 3.

Figure 2:
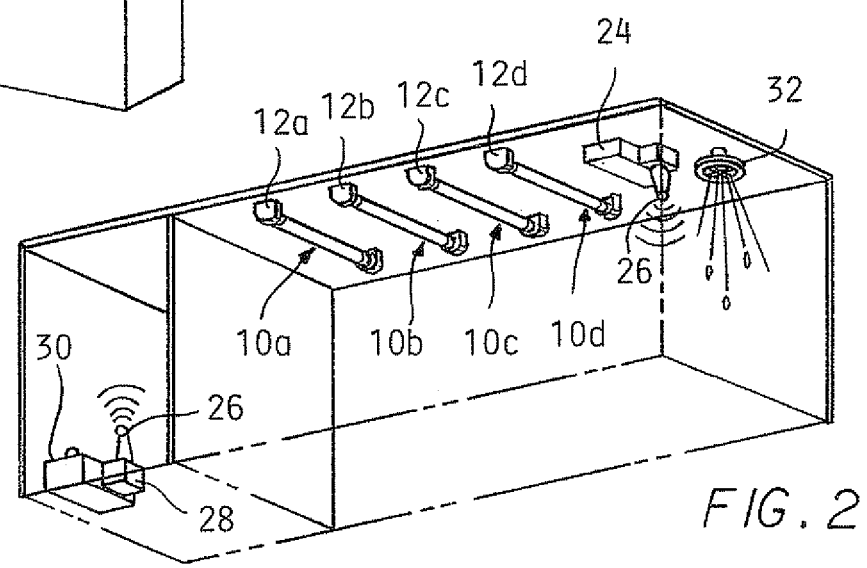
FIG. 2 is a schematic side view schematic of an example of an emergency lighting system including multiple LED-based lights.

FIG. 2 illustrates multiple lights 10a, 10b, and 10c installed in separate fixtures 12a, 12b, and 12c, respectively. One or more emergency detectors, illustrated as a smoke detector 24 and a power monitor 28 in communication with a power source 30 (e.g., an electric power line, a transformer, a generator, or another power source), can detect the presence of an emergency, which in the example shown in FIG. 2 can be smoke or a defect in the power source 30. Other emergency detectors can include a fire alarm, a burglar alarm, an alarm to indicate a door is ajar, a tornado alarm, an air raid siren, or some other type of alarm. The detected emergency can be a fire, a trespasser, an ajar door, a tornado, an air raid signal, or another event for which a warning is helpful. Each emergency detector can include a self-contained sensor to detect the emergency, e.g., the smoke detector 24 can include an optical detector or an ionization detector. Alternatively, an emergency detector can be in communication with some other device for indicating the presence of an emergency, e.g., a tornado alarm can be in communication with a weather service.

Each emergency detector can also include a signal transmitter 26 operable to transmit an emergency signal $\alpha$ to the controller 22 in response to detection of an emergency. Alternatively, multiple emergency detectors can be in communication with a single signal transmitter. When multiple emergency detectors are in communication with a single signal transmitter, the single signal transmitter can be in communication with the signal receiver in the controller 22 of each light 10a, 10b, and 10c via hard-wiring or wireless communication using one of the protocols mentioned above. The transmitters 26 shown in FIG. 2 can also be operable to transmit an alarm notification $\beta$ to a response system, such as an illustrated sprinkler system 32, an emergency response center or a security office, an automatic door locking system, or another location. Like the emergency signal $\alpha$, the alarm notification $\beta$ can be sent through a wired connection (such as a telephone line) or wirelessly using one of the protocols mentioned above or another wireless protocol.

In operation, during a normal mode of operation in which no emergency is detected, the controller 22 can control the LEDs 20 to produce a generally constant flux of light (i.e., the controller 22 can provide a generally constant amount of power to the LEDs 20 such that the LEDs 20 do not appear to flicker). The exact amount of light produced during the normal mode need not be constant under all conditions. For example, the controller 22 can vary the power in response to a dimmer switch, ambient light conditions, or some other circumstances.

Figure 3:
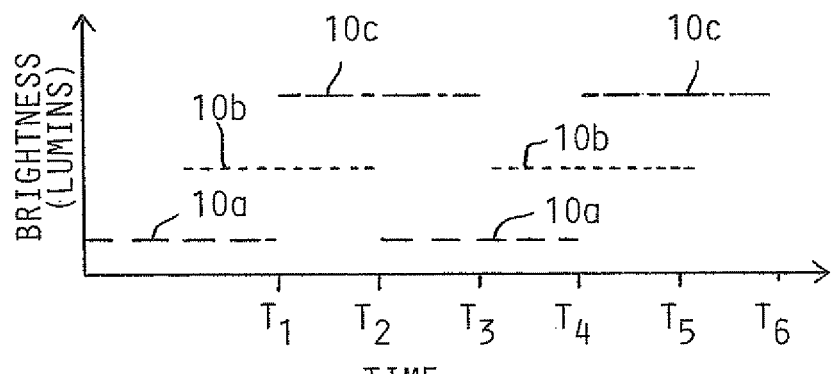
FIG. 3 is a graph showing an example of light produced by the emergency lighting system of FIG. 2 when operating in an emergency mode.

Upon the occurrence of an emergency, the emergency detector can detect the emergency and communicate the presence of an emergency to the transmitter 26. The transmitter 26 can transmit the emergency signal α to the controller 22 and the notification signal β to the response system. Upon receiving the emergency signal α, the controller 22 can operate the lights 10a, 10b, and 10c in an emergency mode. The emergency mode can include operating the lights 10a, 10b, and 10c to indicate a direction, such as a direction toward an exit, a direction away from the emergency, or a direction toward the emergency. For example, as shown in FIG. 3, light 10a can produce light at a first brightness level while lights 10b and 10c are off. Light 10a can stop producing light, and light 10b can begin producing light at a second brightness level greater than the first brightness level. Light 10b can then stop producing light, and light 10c can begin producing light at third brightness level greater than the second brightness level. As a result, the lights 10a, 10b, and 10c can produce an increasingly bright pattern of light moving toward the smoke detector 24. The pattern can be reversed, with light 10c first operating at the first brightness level, followed by operation of light 10b at the second brightness level, then light 10c at the third brightness level to produce a pattern in the opposite direction.

Operating in the emergency mode can include other light patterns from the pattern described with reference to FIG. 3. As an example, all of lights 10a, 10b, and 10c can remain on while each successive light 10a, then 10b, and then 10c increases or decreases in brightness to produce a pattern of light toward or away from the emergency. As another example, the pattern can be based on the location of the lights 10a, 10b, and 10c relative to the emergency, such as by operating one of the lights 10a, 10b, and 10c nearest the emergency or nearest an exit in a manner to indicate that the emergency or the exit is nearby (e.g., illuminating the light brighter than other lights or flashing the light in a unique pattern).

Figure 4:
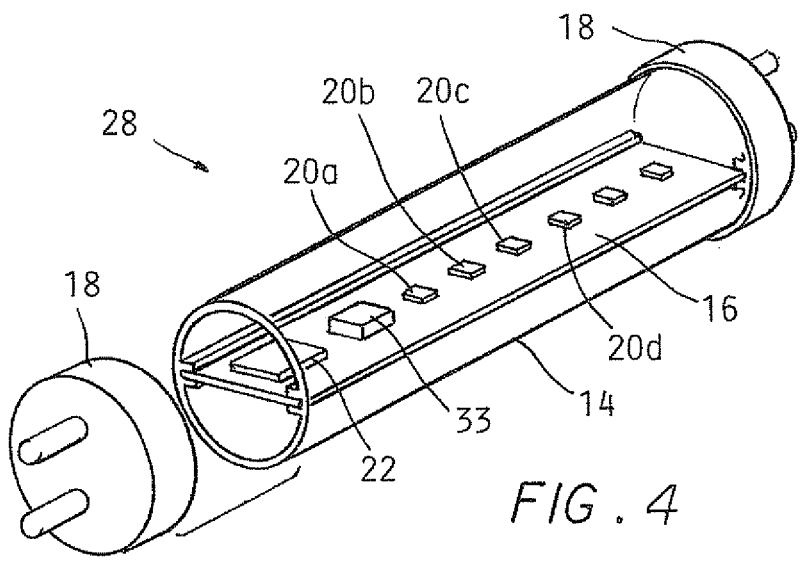
FIG. 4 is a schematic perspective schematic view of another example of an LED-based light for use in an emergency lighting system.
Figure 5:
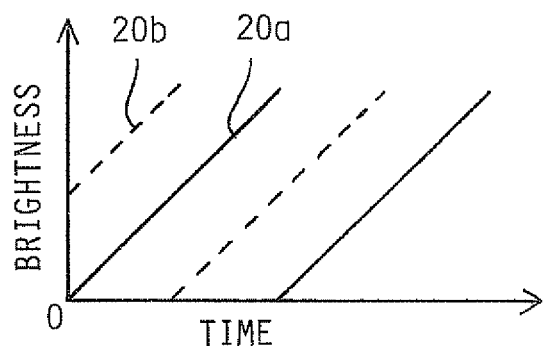
FIG. 5 is a graph showing an example of light produced by the LED-based light of FIG. 4 when operating in an emergency mode.

As yet another example of a pattern of light produced during emergency mode operation, FIG. 4 illustrates another light 28 including the housing 14, circuit board 16, and end caps 18 as described with reference to the light 10. The light 28 additionally includes multiple LEDs 20, with LEDs 20a-d illustrated (though a greater or fewer number of LEDs 20 can be included). The LEDs 20a-d can be illuminated at different brightness levels from each other to produce a pattern. For example, as shown in FIG. 5, LED 20b can be brighter than LED 20a, and both lights can increase in brightness. When LED 20b reaches a predetermined brightness, its brightness can be reduced to a low level before being increased back to the predetermined level. Similarly, the brightness of the LED 20a can be controlled in the same manner, though the LED 20a reaches the predetermined brightness level at a later point in time than the LED 20b. LEDs 20c and 20d can be controlled similarly such that LED 20d reaches the predetermined brightness level first, followed by LED 20c, then LED 20b, and lastly LED 20a. As a result, the light 28 appears to produce a bright line travelling in the direction from LED 20a toward LED 20d. This bright line can be controlled in a direction toward an emergency or an exit or away from the emergency. If the light 28 is near the emergency, the LEDs 20a-d can be controlled in a different manner, such as by flashing or creating two lines pointing toward a center of the light 28.

Additionally, operation of the lights 10a, 10b, and 10c can include modifying the production of light in ways other than producing patterns. For example, if the power monitor 28 detects a defect in the power source 30, such as a power outage, operating a generator to provide power, a low level of power remaining in a generator, or some other indication that the power source 30 is not operating under normal conditions, the transmitter 26 in communication with the power monitor 28 can transmit the emergency signal α to the signal receiver of the controller 22 in each light 10a, 10b, and 10c. Each controller 22 can reduce an amount of power supplied to each light 10a, 10b, and 10c by reducing the brightness of all LEDs 20, no longer providing power to some of the LEDs 20, or a combination of the two.

Figure 6:
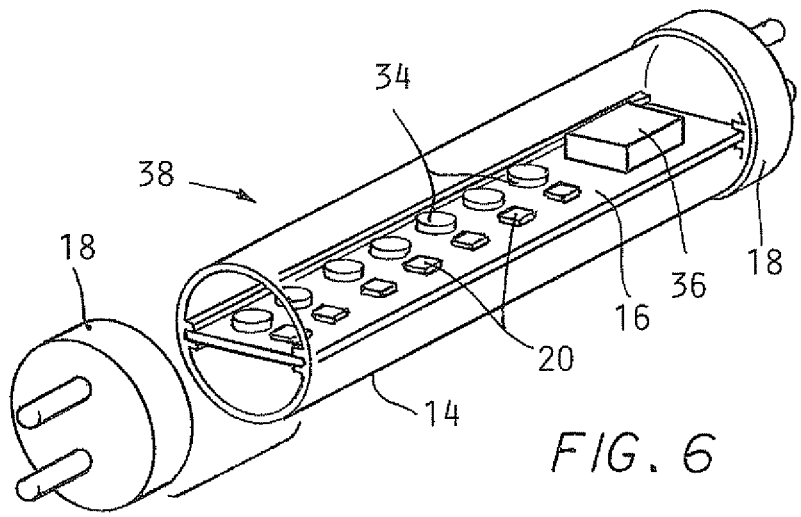
FIG. 6 is a schematic perspective view of yet another example of an LED-based light for use in an emergency lighting system.

As another example, FIG. 6 illustrates a light 38 having a similar structure as the light 10 (i.e., including the housing 14, the circuit board 16, the end caps 18, and the LEDs 20), but additionally including a group of color-producing LEDs 34. The LEDs 34 can produce a different color of light than the LEDs 20. For example, if the LEDs 20 produce white light, the LEDs 34 can produce red light, green light, orange light, or another color of light. Additionally, two groups of LEDs 34 that produce different colors can be included, such as a group of green light producing LEDs and a group of red light producing LEDs. Operation in the emergency mode can include powering the colored LEDs 34. For example, the LEDs 34 can be turned on or flash to indicate the presence of an emergency. The LEDs 34 can also perform other functions, such as producing a directional pattern of light to as described above in reference to FIG. 4. Additionally, having multiple colors of LEDs 34 can allow more versatile guiding. For example, a green group of the LEDs 34 can indicate a pattern toward an exit, while a red group of LEDs 34 can indicate a pattern toward the emergency.

Regarding the notification signal β, the response system can take an appropriate action upon receiving the notification signal β. For example, referring back to FIG. 2, if the response system includes the sprinkler system 32 and the notification signal β indicates the presence of a fire, the sprinkler system 32 can release water. As another example, if the response system includes an emergency response center (e.g., a security center, a fire station, or a paramedic), personnel at the emergency response center can respond accordingly. Additionally, the notification signal α can communicate the location of the emergency to aid in the response to the emergency. For example, the sprinkler system 32 can release water only in locations in which a fire is detected, though the sprinkler system can also release water in other areas, e.g., adjacent areas likely to be affected by the fire. As another example, the notification signal β can alert personnel at the emergency response center of the location of the emergency (e.g., a fire is on the third floor of the southwest wing of a building).

While the emergency detector has been described as being separate from the light 10 shown in FIG. 1, the emergency detector can alternatively be included in the package defined by the housing 14 and end caps 18 as shown in the lights 28 and 38. That is, as shown in FIG. 4, the light 28 includes both a controller 22 and an emergency detector 33. The emergency detector 33 can include a sensor to detect one or more types of emergencies, such as a fire, smoke, a trespasser, or another emergency. That is, the sensor can include a motion sensor to detect a trespasser, an optical or ionization detector for smoke detection, a receiver to receive an emergency broadcast from (e.g., a weather service), and/or some another type of sensor to detect an emergency. Similarly, the light 38 as shown in FIG. 6 can include a single component 36 functioning as both a detector and controller. That is, the detector and controller can be integral to the single component 36. Thus, the lights 28 and 38 can be installed in the fixture 12 to provide an alarm system without the need for modifications to an existing lighting or alarm infrastructure (e.g., without the need for installing wires to a separate emergency detector or upgrading an emergency detector to transmit a wireless signal).

In addition to being installable in a standard fixture, e.g., the fixture 12, the lights 10, 28, 38 can provide other benefits. For example, the directional patterns produced by LEDs 20 can lead a viewer toward or away from the emergency, toward an exit or stairwell, or in another direction. Also, as a result of using LEDs 20, which can produce light virtually instantaneously upon receiving power, the lights 10, 28, and 38 can produce patterns that are impractical with a fluorescent tube having a long start-up time. Further, the lights 10, 28, and 38 can be installed in a "smart building" for interaction with a central controller or emergency detector. The lights 10, 28, and 38 can reduce the amount of wiring required for an alarm system by combining multiple components in a single package, thereby reducing the cost of an emergency system. The lights 10, 28, and 38 can also improve the aesthetics of the building by eliminating known alarm systems, such as smoke detectors and fire alarms, that some may find visually unappealing.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. An LED-based light sized for compatibility with a standard light fixture, comprising:
   at least a first LED and a second LED;
   a controller operable to:
   receive an emergency signal indicating a switch from a normal mode to an emergency mode, and
   in response to the emergency signal, control the operation of the first LED and the second LED, the operation including operating the first LED at a different brightness than the second LED; and
   at least one connector for compatibility with a standard light fixture.

2. The LED-based light of claim 1, wherein the operation includes operating the first LED at a different brightness than the second LED to produce a pattern of light indicating a direction toward or away from an emergency location.

3. The LED-based light of claim 1, wherein the operation includes varying a brightness of the first LED and varying a brightness of the second LED.

4. The LED-based light of claim 1, wherein the operation includes varying a brightness of the first LED from a low level to a predetermined brightness, and varying a brightness of the second LED from the low level to the predetermined brightness, with the brightness of the second LED reaching the predetermined brightness after the first LED.

5. The LED-based light of claim 1, further comprising:
   a housing with opposing longitudinal ends and including a light transmitting portion;
   a circuit board extending longitudinally within the housing and including the first LED and the second LED, the first LED and the second LED longitudinally spaced on the circuit board and oriented to produce light through the light transmitting portion of the housing; and
   a pair of standard sized connectors, one at each longitudinal end of the housing, for compatibility with a standard fluorescent light fixture.

6. The LED-based light of claim 1, wherein the LED-based light is shaped as a fluorescent tube for compatibility with a fluorescent fixture.

* * * * *